United States Patent
Onohara (10) Patent No.: US 8,931,799 B2
(45) Date of Patent: Jan. 13, 2015

(54) AIRBAG DEVICE AND STEERING WHEEL

(75) Inventor: Keisuke Onohara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/004,826

(22) PCT Filed: Mar. 9, 2012

(86) PCT No.: PCT/JP2012/056147
§ 371 (c)(1),
(2), (4) Date: Sep. 12, 2013

(87) PCT Pub. No.: WO2012/124633
PCT Pub. Date: Sep. 20, 2012

(65) Prior Publication Data
US 2014/0008900 A1 Jan. 9, 2014

(30) Foreign Application Priority Data
Mar. 14, 2011 (JP) ................................ 2011-055762

(51) Int. Cl.
*B60R 21/215* (2011.01)
*B60R 21/203* (2006.01)

(52) U.S. Cl.
CPC ............. *B60R 21/203* (2013.01); *B60R 21/215* (2013.01); *B60R 21/2037* (2013.01)
USPC ........................................ 280/731; 280/728.2

(58) Field of Classification Search
CPC .. B60R 21/20; B60R 21/203; B60R 21/2035; B60R 21/2037; B60R 21/215; B60R 21/217
USPC .............................................. 280/728.2, 731
See application file for complete search history.

(56) References Cited

U.S. PATENT DOCUMENTS 5,520,411 A * 5/1996 Lang et al. ................. 280/728.3
5,797,622 A * 8/1998 Turner et al. ................... 280/731

(Continued)

FOREIGN PATENT DOCUMENTS

| GB | 2 339 408 A | 1/2000 |
|---|---|---|
| JP | 07-052737 | 2/1995 |
| JP | 07-144595 | 6/1995 |
| JP | 07-144596 | 6/1995 |
| JP | 3036890 U | 2/1997 |
| JP | 09-058391 | 3/1997 |
| JP | 09-263208 | 10/1997 |
| JP | 10-129385 | 5/1998 |
| JP | 11-048895 | 2/1999 |
| JP | 11-222091 | 8/1999 |
| JP | 2000-095054 | 4/2000 |
| JP | 2001-146142 | 5/2001 |
| JP | 2005-505454 | 2/2005 |
| JP | 2008-213532 | 9/2008 |
| WO | WO 03/031230 A2 | 4/2003 |

OTHER PUBLICATIONS

International Search Report PCT/JP2012/056147 dated May 22, 2012.

*Primary Examiner* — Ruth Ilan
*Assistant Examiner* — Timothy Wilhelm
(74) *Attorney, Agent, or Firm* — Foley & Lardner LLP (57) ABSTRACT

There are provided an airbag device and a steering wheel that can reduce the number of components and weight and allow a retainer to be easily positioned relative to an airbag cover. An airbag cover 4 includes a side wall portion 41 standing on an inner side, a recess 42 formed in an end face at almost the center of the side wall portion 41, and retaining holes 43 and 43 formed in the side wall portion 41 on both sides of the recess 42. A retainer 3 includes a first hook 31 that is fittable in the recess 42 and contactable with a bottom face 42a of the recess 42, and second hooks 32 that are contactable with inner faces 43a of the retaining holes 43. The retainer 3 is centered in a width direction by fitting the first hook 31 in the recess 42, and the side wall portion 41 is clamped in a standing direction by the first hook 31 and the second hooks 32 by contacting the first hook 31 with the recess 42 and contacting the second hooks 32 with the retaining holes 43.

8 Claims, 5 Drawing Sheets

(56) References Cited

U.S. PATENT DOCUMENTS

| | | |
|---|---|---|
| 6,186,535 B1 * | 2/2001 | Sugiyama et al. ......... 280/728.2 |
| 6,419,261 B1 * | 7/2002 | Ibe ............................ 280/728.2 |
| 6,752,415 B2 * | 6/2004 | Nelson et al. .............. 280/728.2 |
| 7,293,794 B2 * | 11/2007 | Clarke et al. ................. 280/731 |
| 7,393,003 B2 * | 7/2008 | Meson ....................... 280/728.2 |
| 7,758,065 B2 * | 7/2010 | Weigand et al. ........... 280/728.2 |
| 8,205,908 B2 * | 6/2012 | Matsu et al. ............... 280/728.2 |
| 8,511,707 B2 * | 8/2013 | Amamori et al. .......... 280/728.2 |

\* cited by examiner

AIRBAG DEVICE AND STEERING WHEEL

TECHNICAL FIELD

The present invention relates to an airbag device and a steering wheel, and more particularly, to an airbag device suitable for use as a driver airbag device and a steering wheel equipped with the airbag device.

BACKGROUND ART

A vehicle, such as an automobile, includes a steering system for controlling a traveling direction. In general, an operation mechanism of such a steering system includes, for example, a steering wheel used by an occupant to control the steering angle, a steering shaft for transmitting the rotation of the steering wheel to a gear box, a steering column for supporting the steering shaft, a column cover covering the steering column, and a turn signal switch unit for operating a turn signal.

The steering wheel includes an annular rim section, a boss section that forms a joint portion with the steering shaft, a plurality of spoke sections that connect the boss section and the rim section, and a pad section provided at almost the center of the boss section. The pad section includes an airbag cover that forms a front surface, and an airbag device and a horn switch are provided within the airbag cover. A typical airbag device includes an airbag that is normally folded and is inflated and deployed in an emergency, an inflator for supplying gas to the airbag, and a retainer for fixing the airbag and the inflator. The airbag device and the airbag cover are generally fixed by fixing the retainer to a side wall portion standing on a back side of the airbag cover (see, for example, PTL 1 and PTL 2).

For example, an airbag device described in PTL 1 includes a support member (base plate) for supporting an airbag, and a cover body attached to the support member to cover the folded airbag. The support member includes inner engaging portions to be engaged with an inner side of the cover body, and an outer engaging portion to be engaged with an outer side of the cover body. Here, the airbag is attached to the base plate by inserting attachment bolts provided integrally with a preset retainer in attachment holes of the airbag, exposing them from attachment holes of the base plate, and fixing them with by nuts. The cover body can be firmly held by the inner engaging portions and the outer engaging portion formed integrally with the support member so that the cover body does not internally and externally deform and fall off. This can reduce the number of components, the cost, and the weight of the airbag device.

An airbag device described in PTL 2 is an example of an airbag device including a retainer that clamps and combines a cover member for housing an inflator and a folded airbag by using assist plates and fasteners. In a driver airbag device, a cover body and a retainer are often fastened together by using assist plates and fasteners (for example, rivets), as described in PTL 2.

CITATION LIST

Patent Literature

PTL 1: Japanese Unexamined Patent Application Publication No. H09-58391
PTL 2: Japanese Unexamined Patent Application Publication No. 2008-213532

SUMMARY OF INVENTION

Technical Problem

However, in the above-described airbag device described in PTL 2, the cover body (airbag cover) and the retainer are fastened together by using the assist plates and the fasteners (for example, rivets) made from metal. Hence, the number of components is large, and this is likely to increase the cost and the weight.

The above-described airbag device described in PTL 1 has a configuration such that the side wall portion is clamped by the inner engaging portions and the outer engaging portion. Hence, the support member (base plate) is likely to be displaced to right and left. Particularly during manufacturing, centering in a width direction (right-left direction) may be difficult, and positioning of the support member may be difficult depending on the shape of the retainer or the airbag cover.

The present invention has been made in view of such problems, and an object of the invention is to provide an airbag device and a steering wheel that can reduce the number of components and weight and that allow a retainer to be easily positioned relative to an airbag cover.

Solution to Problem

The present invention provides an airbag device including an airbag that is normally folded and is inflated and deployed in an emergency, an inflator for supplying gas to the airbag, a retainer for fixing the airbag and the inflator, and an airbag cover for housing the airbag. The airbag cover includes a side wall portion standing on an inner side, a recess formed in an end face at almost the center of the side wall portion, and retaining holes formed in the side wall portion on both sides of the recess. The retainer includes a first hook that is fittable in the recess and contactable with a bottom face of the recess, and second hooks that are contactable with inner faces of the retaining holes. The retainer is centered in a width direction by fitting the first hook in the recess, and the side wall portion is clamped in a standing direction by contacting the first hook with the recess and contacting the second hooks with the retaining holes so as to position the retainer relative to the airbag cover.

The present invention also provides a steering wheel including an annular rim section, a boss section that forms a joint portion with a steering shaft, a plurality of spoke sections that connect the boss section and the rim section, and a pad section provided at almost the center of the boss section. The pad section is formed by an airbag device including an airbag that is normally folded and is inflated and deployed in an emergency, an inflator for supplying gas to the airbag, a retainer for fixing the airbag and the inflator, and an airbag cover for housing the airbag. The airbag cover includes a side wall portion standing on an inner side, a recess formed in an end face at almost the center of the side wall portion, and retaining holes formed in the side wall portion on both sides of the recess. The retainer includes a first hook that is fittable in the recess and contactable with a bottom face of the recess, and second hooks that are contactable with inner faces of the retaining holes. The retainer is centered in a width direction by fitting the first hook in the recess, and the side wall portion is clamped in a standing direction by contacting the first hook with the recess and contacting the second hooks with the retaining holes so as to position the retainer relative to the airbag cover.

In the airbag device and the steering wheel described above, the side wall portion may have insertion holes on both sides of the recess, the retainer may have third hooks insertable in the insertion holes, and distal ends of the third hooks may have turned-back portions contactable with a side surface of the side wall portion.

A length of the turned-back portions in the standing direction may be more than a width of the insertion holes in the standing direction.

The side wall portion may be clamped in the standing direction by the second hooks and the third hooks by contacting the third hooks with inner faces of the insertion holes instead of contacting the first hook with the recess.

The airbag device is provided at almost the center of a steering wheel, and for example, the side wall portion stands at almost a twelve o'clock position in a state in which the steering wheel is stopped at a neutral position.

Advantageous Effects of Invention

According to the airbag device and the steering wheel of the present invention described above, since the airbag cover and the retainer are fixed without using assist plates and fasteners, the number of components and weight can be reduced. Further, the retainer is centered in the width direction by fitting the first hook in the recess, and the side wall portion is clamped in the standing direction by contacting the first hook with the recess and contacting the second hooks with the retaining holes. Therefore, the retainer can be restricted from being displaced relative to the airbag cover in the right-left direction, and the retainer can be easily positioned relative to the airbag cover.

By forming, in the retainer, the third hooks having the turned-back portions contactable with the side surface of the side wall portion and inserting the third hooks in the insertion holes of the side wall portion when fixing the airbag cover and the retainer, the first hook or the second hooks can be restricted from falling off. Even when the first hook or the second hooks fall off the side wall portion, the retainer can be restricted from falling off. In particular, the retainer can be effectively restricted from falling off by setting the length of the turned-back portions in the standing direction to be more than the width of the insertion holes in the standing direction.

By contacting the third hooks with the inner faces of the insertion holes, advantages similar to those provided when the first hook is contacted with the bottom face of the recess can be provided. In this case, the retainer is centered in the width direction by the first hook, and the side wall portion is clamped by the second hooks and the third hooks.

Since the side wall portion stands at almost the twelve o'clock position in the state in which the steering wheel is stopped at the neutral position, a sufficient width to form the side wall portion can be ensured in the right-left direction, and the recess and the retaining holes can be formed easily.

BRIEF DESCRIPTION OF DRAWINGS

FIGS. 1(A) and 1(B) illustrate a first embodiment of an airbag device according to the present invention, wherein

FIGS. 4(A) and 4(B) illustrate other embodiments of the airbag device according to the present invention, wherein

DESCRIPTION OF EMBODIMENTS

Figure 1A:
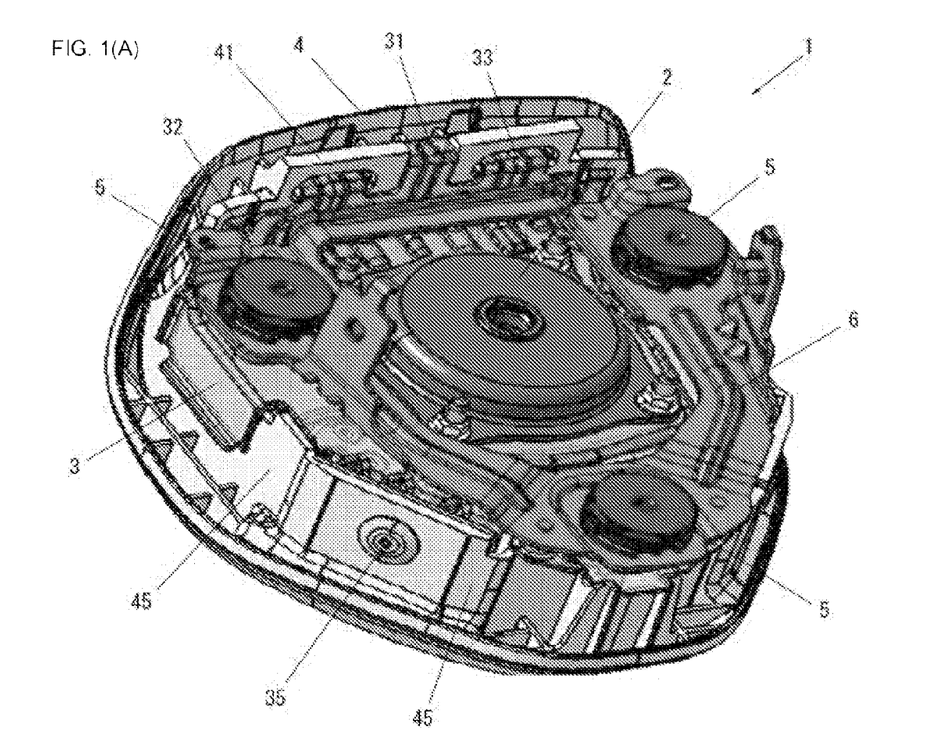
FIG. 1(A) is a rear perspective view.
Figure 1B:
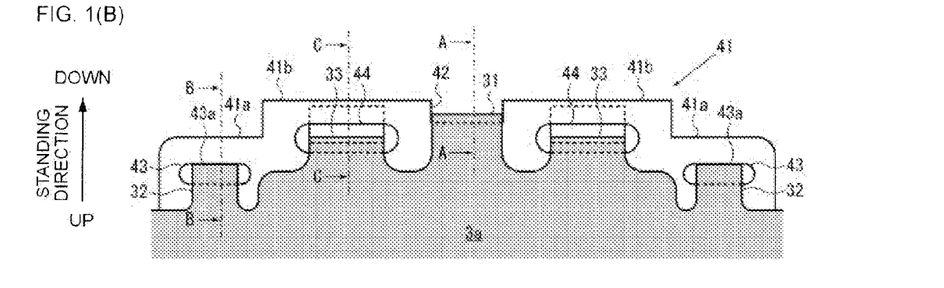
FIG. 1(B) is a partial front view of a side wall portion.
Figure 2A:
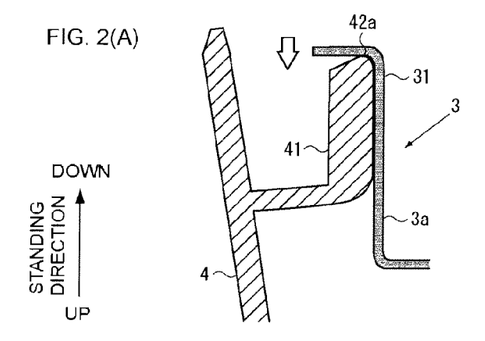
FIGS. 2(A), 2(B), and 2(C) are an A-A cross-sectional view, a B-B cross-sectional view, and a C-C cross-sectional view, respectively, of the side wall portion illustrated in FIG. 1(B).
Figure 2B:
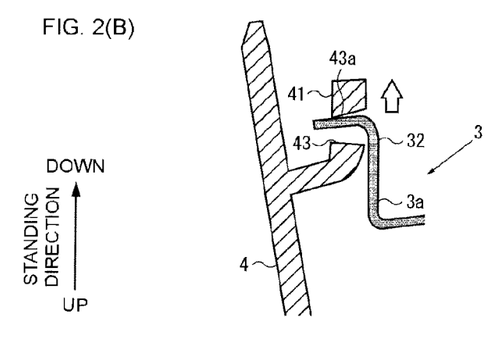
Figure 2C:
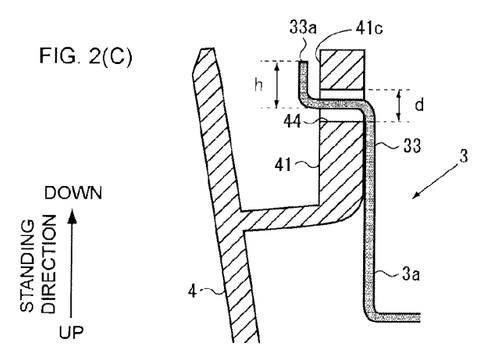
Figure 3:
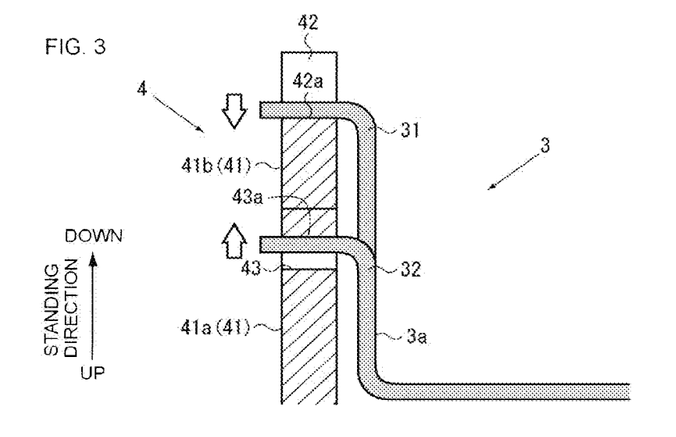
FIG. 3 illustrates a state in which the side wall portion is clamped by a first hook and second hooks.

Embodiments of an airbag device and a steering wheel according to the present invention will be described below with reference to FIGS. 1 to 5. FIG. 1 illustrates a first embodiment of an airbag device according to the present invention, wherein FIG. 1(A) is a rear perspective view, and FIG. 1(B) is a partial front view of a side wall portion. FIGS. 2(A), 2(B), and 2(C) are an A-A cross-sectional view, a B-B cross-sectional view, and a C-C cross-sectional view, respectively, of the side wall portion illustrated in FIG. 1(B). FIG. 3 illustrates a state in which the side wall portion is clamped by a first hook and second hooks.

As illustrated in FIGS. 1 to 3, an airbag device 1 according to a first embodiment of the present invention includes an airbag (not illustrated) that is normally folded and is inflated and deployed in an emergency, an inflator 2 for supplying gas to the airbag, a retainer 3 for fixing the airbag and the inflator 2, and an airbag cover 4 for housing the airbag. The airbag cover 4 includes a side wall portion 41 standing on an inner side thereof, a recess 42 formed in an end face at almost the center of the side wall portion 41, and retaining holes 43 and 43 formed in the side wall portion 41 on both sides of the recess 42. The retainer 3 includes a first hook 31 that is fittable in the recess 42 and contactable with a bottom face 42a of the recess 42, and second hooks 32 and 32 that are contactable with inner faces 43a of the retaining holes 43. The retainer 3 is centered in a width direction by fitting the first hook 31 in the recess 42, and the side wall portion 41 is clamped in a standing direction by contacting the first hook 31 with the recess 42 and contacting the second hooks 32 with the retaining holes 43, so that the retainer 3 is positioned relative to the airbag cover 4.

The airbag device 1 is a driver airbag device, and is provided at almost the center of a steering wheel. In FIG. 1(A), the airbag (not illustrated) is housed in a folded manner in a space between the retainer 3 and the airbag cover 4. When gas is supplied into the airbag (not illustrated) upon actuation of the inflator 2, the airbag starts inflation and deployment, breaks through the airbag cover 4, is released into the vehicle cabin, and inflates and deploys in front of an occupant sitting in a driver's seat.

The inflator 2 is a gas generator that generates gas to be supplied to the airbag, and for example, has a substantially disk-like outer shape. While the disk type inflator 2 is illustrated here, a cylinder type inflator having a substantially columnar outer shape may be used. The inflator 2 is connected to an unillustrated ECU (electronic control unit), and is controlled on the basis of measured values of an acceleration sensor and the like. When the ECU senses or predicts a collision and abrupt deceleration of a vehicle, the inflator 2 is ignited by ignition current from the ECU, generates gas by burning a medical agent stored in the inflator 2, and supplies the gas to the airbag.

The retainer 3 has an outer shape such as to be fittable on peripheral wall portions 45 standing on an inner side of the airbag cover 4 (on a back side of a front surface), and for example, is fixed by fasteners 35, such as rivets, at four and eight o'clock positions. A description will be given below of an engaging relationship between the side wall portion 41 and the retainer 3 at almost a twelve o'clock position.

In the retainer 3, a horn plate 6 is provided with a plurality of damper mechanisms 5 being disposed therebetween. For example, the damper mechanisms 5 are each formed by a spring, an elastic body, a resin insulator, or a combination of these elements, and support the retainer 3 and the horn plate 6 movable relative to each other. On opposed inner surfaces of the retainer 3 and the horn plate 6, contacts are provided to form a horn switch. By relative movement of the retainer 3 and the horn plate 6, the contacts are brought into contact with each other, so that the horn switch blows.

The airbag cover 4 forms a pad section provided at almost the center of the steering wheel, and forms a part of a vehicle interior surface. On a front side of the airbag cover 4, an emblem or the like is provided. On a back side of a front surface portion of the airbag cover 4 that forms the vehicle interior surface, a thin-walled tear line is provided. The airbag cover 4 tears open along the tear line to release the airbag into the vehicle cabin.

For example, as illustrated in FIG. 1(A), the airbag cover 4 has peripheral wall portions 45 standing at three, four, six, eight, and nine o'clock positions. At almost a twelve o'clock position, the side wall portion 41 larger than the other peripheral wall portions 45 stands.

As illustrated in FIG. 1(B), the side wall portion 41 includes first high portions 41a formed on both sides, and second high portions 41b formed between the first high portions 41a. The first high portions 41a are made lower than the second high portions 41b to eliminate unnecessary portions for a smaller thickness. The first high portions 41a and the second high portions 41b may have the same height.

The recess 42 is formed at almost the center of the side wall portion 41, that is, at almost the midpoint between the second high portions 41b. Since the side wall portion 41 stands at almost the twelve o'clock position in a state in which the steering wheel is stopped at a neutral position, the recess 42 is located on almost a center line of the airbag cover 4. The recess 42 has a bottom face 42a in a depressed portion.

A pair of first high portions 41a have respective retaining holes 43. For example, the retaining holes 43 are shaped to extend long in a right-left direction, and have inner faces 43a on a lower side in the standing direction (upper side in the figures). Further, a pair of second high portions 41b have respective insertion holes 44. That is, the side wall portion 41 has the insertion holes 44 and 44 on both sides of the recess 42. For example, the insertion holes 44 are shaped to extend long in the right-left direction, and have inner faces 44a on the lower side in the standing direction (upper side in the figures).

In contrast, the retainer 3 has a vertical portion 3a bent along the side wall portion 41. The vertical portion 3a has a first hook 31 corresponding to the recess 42, second hooks 32 and 32 corresponding to the retaining holes 43 and 43, and third hooks 33 corresponding to the insertion holes 44 and 44.

As illustrated in FIG. 1(B), the first hook 31 has a width in the right-left direction such as to be fittable in the recess 42. By minimizing a gap between the first hook 31 and the recess 42 in the right-left direction, the first hook 31 can be restricted from being displaced in the right-left direction when fitted in the recess 42, and this allows the retainer 3 to be more accurately centered in the width direction (right-left direction). Further, as illustrated in FIG. 2(A), the first hook 31 is contactable with at least a part of the bottom face 42a of the recess 42. By contacting the first hook 31 with the bottom face 42a of the recess 42 in this way, an upward force in the standing direction can be applied to the side wall portion 41.

As illustrated in FIG. 1(B), the second hooks 32 have a width in the right-left direction such as to be fittable in the retaining holes 43. Further, as illustrated in FIG. 2(B), each of the second hooks 32 is contactable with at least a part of the inner face 43a of the corresponding retaining hole 43. By contacting the second hooks 32 with the inner faces 43a of the retaining holes 43 in this way, a downward force in the standing direction can be applied to the side wall portion 41.

By thus applying the upward force in the standing direction from the first hook 31 to the side wall portion 41 and applying the downward force in the standing direction from the second hooks 32 to the side wall portion 41, the side wall portion 41 can be clamped by the first hook 31 and the second hooks 32, and the retainer 3 can be fixed to the airbag cover 4, as illustrated in FIG. 3. Therefore, the retainer 3 can be centered in the width direction by fitting the first hook 31 in the recess 42, and the side wall portion 41 can be clamped in the standing direction by the first hook 31 and the second hooks 32 by contacting the first hook 31 with the recess 42 and contacting the second hooks 32 with the retaining holes 43, so that the retainer 3 can be positioned relative to the airbag cover 4.

As illustrated in FIG. 1(B), the third hooks 33 have a width in the right-left direction such as to be insertable in the insertion holes 44. Further, as illustrated in FIG. 2(C), the third hooks 33 are inserted such as not to contact with inner faces of the insertion holes 44, and have turned-back portions 33a at distal ends thereof. That is, the retainer 3 has the third hooks 33 insertable in the insertion holes 44, and the distal ends of the third hooks 33 have the turned-back portions 33a contactable with a side surface 41c of the side wall portion 41.

A length h of the turned-back portions 33a in the standing direction is more than a width d of the insertion holes 44 in the standing direction. When the length h of the turned-back portions 33a is more than the width d of the insertion holes 44 in this way, even if the first hook 31 or the second hooks 32 fall off the side wall portion 41, the turned-back portions 33a contact with the side surface 41c of the side wall portion 41, but do not come out of the insertion holes 44. This can effectively restrict the retainer 3 from falling off.

According to the airbag device 1 of the above-described first embodiment, the retainer 3 and the airbag cover 4 are fixed at the fixing portion at the twelve o'clock position without using assist plates and fasteners. Hence, the number of components and weight can be reduced.

Figure 4A:
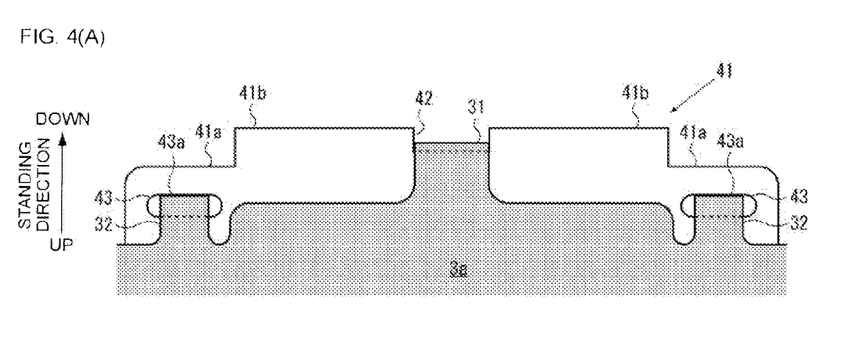
FIG. 4(A) illustrates a second embodiment.
Figure 4B:
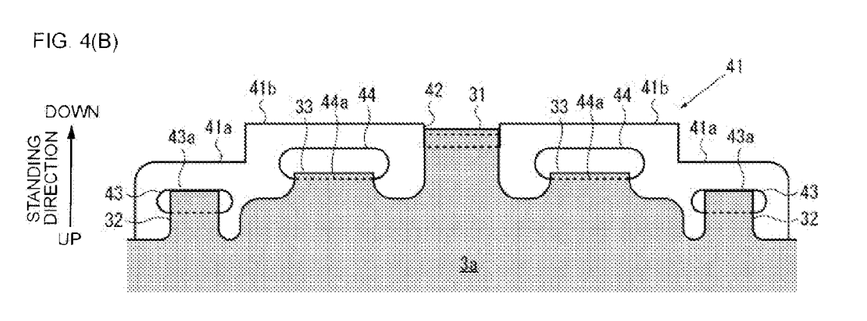
FIG. 4(B) illustrates a third embodiment.

Next, other embodiments of the airbag device 1 according to the present invention will be described. Here, FIGS. 4(A) and 4(B) illustrate other embodiments of the airbag device according to the present invention, wherein FIG. 4(A) illustrates a second embodiment, and FIG. 4(B) illustrates a third embodiment. The same constituent parts as those adopted in the above-described first embodiment are denoted by the same reference numerals, and redundant descriptions thereof are skipped.

As illustrated in FIG. 4(A), third hooks 33 and insertion holes 44 are omitted in an airbag device 1 of the second embodiment. In such a structure, a retainer 3 can also be centered in the width direction by fitting a first hook 31 in a recess 42, and a side wall portion 41 can be clamped in the standing direction by the first hook 31 and second hooks 32 by contacting the first hook 31 with the recess 42 and contacting the second hooks 32 with retaining holes 43, so that the retainer 3 can be positioned relative to an airbag cover 4.

To restrict the retainer 3 from falling off in the second embodiment, turned-back portions contactable with a side surface of the side wall portion 41 may be provided at distal ends of the first hook 31 or the second hooks 32.

As illustrated in FIG. 4(B), in an airbag device 1 of the third embodiment, a side wall portion 41 is clamped in the standing direction by second hooks 32 and third hooks 33 by contacting the third hooks 33 with inner faces 44a of the insertion holes 44 instead of contacting a first hook 31 with a recess 42. In such a structure, a retainer 3 can also be centered in the with direction by fitting the first hook 31 in the recess 42, and the side wall portion 41 can be clamped in the standing direction by the second hooks 32 and the third hooks 33 by contacting the second hooks 32 with the retaining holes 43 and contacting the third hooks 33 with the insertion holes 44, so that the retainer 3 can be positioned relative to an airbag cover 4.

In the third embodiment, the first hook 31 is preferably out of contact with a bottom face 42a of the recess 42 so as not to hinder the second hooks 32 and the third hooks 33 from clamping the side wall portion 41.

Next, an embodiment of a steering wheel according to the present invention will be described. Here, FIGS. 5(A) and 5(B) are a top view and a back view, respectively, illustrating the embodiment of the steering wheel according to the present invention.

Figure 5A:
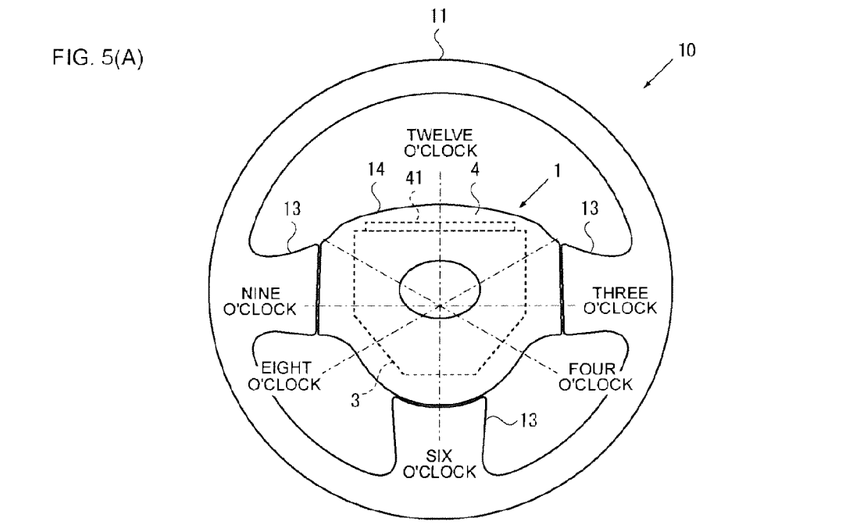
FIGS. 5(A) and 5(B) are a top view and a back view, respectively, illustrating an embodiment of a steering wheel according to the present invention.
Figure 5B:
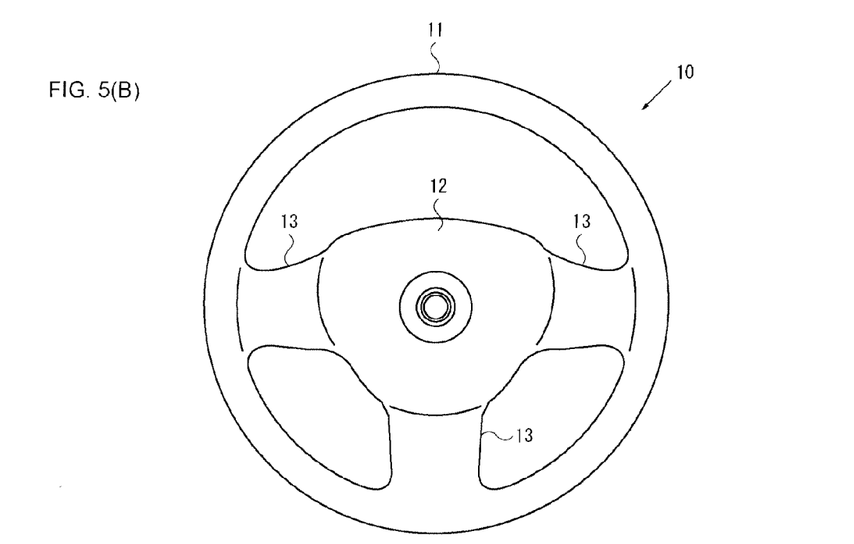

As illustrated in FIGS. 5(A) and 5(B), a steering wheel 10 according to the embodiment of the present invention includes an annular rim section 11, a boss section 12 that forms a joint portion with a steering shaft (not illustrated), a plurality of spoke sections 13 that connect the boss section 12 and the rim section 11, and a pad section 14 provided at almost the center of the boss section 12. The pad section 14 is formed by the airbag device 1 according to any of the above-described first to third embodiments.

Therefore, according to this steering wheel 10, it is possible to reduce the number of components and weight and to allow a retainer 3 to be easily positioned relative to an airbag cover 4, similarly to the airbag device 1.

The above-described steering wheel 10 is used when the occupant controls the steering angle, and forms an operation mechanism in a steering system for a vehicle, such as an automobile, for example, by a steering shaft (not illustrated) for transmitting the rotation of the steering wheel 10 to a gear box, a steering column (not illustrated) for supporting the steering shaft, a column cover (not illustrated) covering the steering column, and a turn signal switch unit for operating a turn signal.

A state in which the steering wheel 10 is stopped at a neutral position means a state illustrated in FIG. 5(A), and means a state in which the steering wheel 10 directly faces the occupant.

While the present invention is applied to the driver airbag device in the above-described embodiments, it may be applied to, for example, a passenger airbag device, a side airbag device, a curtain airbag device, a knee airbag device, or a pedestrian airbag device as long as the airbag device can adopt a similar structure.

The present invention is not limited to the above-described embodiments, and various modifications can be made without departing from the scope of the present invention, for example, the positioning mechanism including the hooks of the retainer 3 (for example, the first hook 31 to the third hooks 33) and the side wall portion 41 may be applied to an o'clock position of the airbag cover 4 different from the twelve o'clock position (for example, three, four, six, eight, or nine o'clock position).

REFERENCE SIGNS LIST 1 airbag device
2 inflator
3 retainer
3a vertical portion
4 airbag cover
5 damper mechanism
6 horn plate
10 steering wheel
11 rim section
12 boss section
13 spoke section
14 pad section
31 first hook
32 second hook
33 third hook
33a turned-back portion
35 fastener
41 side wall portion
41a first high portion
41b second high portion
41c side surface
42 recess
42a bottom face
43 retaining hole
43a inner face
44 insertion hole
44a inner face
45 peripheral wall portion

The invention claimed is:

1. An airbag device comprising: an airbag that is normally folded and is inflated and deployed in an emergency; an inflator for supplying gas to the airbag; a retainer for fixing the airbag and the inflator; and an airbag cover for housing the airbag,
wherein the airbag cover includes a side wall portion standing on an inner side, a recess formed in an end face at almost the center of the side wall portion, and retaining holes formed in the side wall portion on both sides of the recess,
wherein the retainer includes a first hook that is fittable in the recess and contactable with a bottom face of the recess, and second hooks that are contactable with inner faces of the retaining holes,
wherein the retainer is centered in a width direction by fitting the first hook in the recess, and the side wall portion is clamped in a standing direction by contacting the first hook with the recess and contacting the second hooks with the retaining holes so as to position the retainer relative to the airbag cover, and
wherein the side wall portion has insertion holes on both sides of the recess, the retainer has third hooks insertable in the insertion holes, and distal ends of the third hooks have turned-back portions contactable with a side surface of the side wall portion.

2. The airbag device according to claim 1,
wherein a length of the turned-back portions in the standing direction is more than a width of the insertion holes in the standing direction.

3. A steering wheel comprising: an annular rim section; a boss section that forms a joint portion with a steering shaft; a plurality of spoke sections that connect the boss section and the rim section; and a pad section provided at almost the center of the boss section, wherein the pad section is formed by the airbag device according to claim 2.

4. The airbag device according to claim 1, wherein the side wall portion is clamped in the standing direction by the second hooks and the third hooks by contacting the third hooks with inner faces of the insertion holes instead of contacting the first hook with the recess.

5. A steering wheel comprising: an annular rim section; a boss section that forms a joint portion with a steering shaft; a plurality of spoke sections that connect the boss section and the rim section; and a pad section provided at almost the center of the boss section, wherein the pad section is formed by the airbag device according to claim 4.

6. The airbag device according to claim 1, wherein the airbag device is provided at almost the center of a steering wheel, and the side wall portion stands at almost a twelve o'clock position in a state in which the steering wheel is stopped at a neutral position.

7. A steering wheel comprising: an annular rim section; a boss section that forms a joint portion with a steering shaft; a plurality of spoke sections that connect the boss section and the rim section; and a pad section provided at almost the center of the boss section, wherein the pad section is formed by the airbag device according to claim 6.

8. A steering wheel comprising: an annular rim section; a boss section that forms a joint portion with a steering shaft; a plurality of spoke sections that connect the boss section and the rim section; and a pad section provided at almost the center of the boss section, wherein the pad section is formed by the airbag device according to claim 1.

\* \* \* \* \*